(12) United States Patent
LeRoy et al.

(10) Patent No.: US 11,414,276 B2
(45) Date of Patent: Aug. 16, 2022

(54) PULLEY WEAR SENSOR SYSTEM AND METHOD

(71) Applicant: Dodge Acquisition Co., Oxford, CT (US)

(72) Inventors: Brandon W LeRoy, Anderson, SC (US); Artur Rdzanek, Simpsonville, SC (US); Isaac P. O'Brien-Herr, Greer, SC (US); Kevin E. Walker, Greenville, SC (US)

(73) Assignee: Dodge Industrial, Inc., Oxford, CT (US)

( * ) Notice: Subject to any disclaimer, the term of this patent is extended or adjusted under 35 U.S.C. 154(b) by 42 days.

(21) Appl. No.: 17/144,809

(22) Filed: Jan. 8, 2021

(65) Prior Publication Data
US 2022/0219908 A1    Jul. 14, 2022

(51) Int. Cl.
*B65G 43/02*    (2006.01)
*B65G 23/04*    (2006.01)

(52) U.S. Cl.
CPC .............. *B65G 43/02* (2013.01); *B65G 23/04* (2013.01); *B65G 2203/0275* (2013.01); *B65G 2203/042* (2013.01); *B65G 2207/48* (2013.01)

(58) Field of Classification Search
None
See application file for complete search history.

(56) References Cited

U.S. PATENT DOCUMENTS

| | | | | |
|---|---|---|---|---|
| 8,330,452 | B2 * | 12/2012 | Furukawa .............. | B65G 43/02 |
| | | | | 324/207.11 |
| 9,533,832 | B1 * | 1/2017 | Wheat .................... | B65G 39/16 |
| 10,513,398 | B2 * | 12/2019 | Roelfsema ............. | B65G 39/07 |
| 10,850,928 | B1 * | 12/2020 | Luer ....................... | G01S 15/04 |
| 2009/0120766 | A1 * | 5/2009 | Markle ................... | B65G 39/02 |
| | | | | 198/781.05 |

* cited by examiner

*Primary Examiner* — Kavel Singh
(74) *Attorney, Agent, or Firm* — Murtha Cullina LLP

(57) ABSTRACT

A drive pulley for a continuous conveyor includes an inner drum and a traction drum disposed along an outer peripheral surface of the inner drum. The traction drum has a thickness in a radial direction relative to the axle that is subject to wear during driving contact between the traction drum and a conveyor belt. At least one sensor is embedded in the traction drum. The at least one sensor has an outer wear surface that coincides with an outer surface of the traction drum. The at least one sensor is configured to wear such that the outer wear surface of the at least one sensor is adapted to wear at a same rate as the outer surface of the traction drum. The at least one sensor is configured to generate a wear signal that is indicative of wear of the traction drum.

20 Claims, 5 Drawing Sheets

PULLEY WEAR SENSOR SYSTEM AND METHOD

BACKGROUND

Continuous conveyor systems are used to convey materials over a distance between a loading point and a discharge point. Such conveyor systems may be used in mining, agriculture, and large-scale manufacturing and may transport bulk materials such as mining aggregates and ore, raw processing materials, and other types of materials. Belt conveyor systems typically include an elongated and flexible belt, for example, of rubber or similar material that is joined to itself to form a continuous loop. The continuous belt is stretched around generally two pulleys, one of which may be powered for rotation and supports one end of the loop, and the second for supporting the second end of the loop such that, when the powered pulley is rotating, the loop rotates with it. Contact with the rotating loop and the second pulley also causes the second pulley to follow in the rotation such that a continuous rotating loop is provided.

The loop, or endless conveyor, may include additional support pulleys and/or support rollers disposed between the first and second end pulleys to support a generally flat upper conveyor surface onto which materials are carried. The rollers and pulleys are typically cylindrical or may have or provide a conforming profile shape, for example, a U-shape in cross section, to the conveyor.

At its ends, the conveyor or loop may wrap around the end pulleys by as much as 180 degrees around the rotation axis, while the belt or loop may only tangentially contact the intermediate or support pulleys and rollers. For example, the end pulleys may be constructed as drums, which may be hollow and constructed of tubular steel welded to end plates to reduce weight and maintain continuous contact with the belt. A layer of rubber or another traction medium may be wrapped around the outer periphery of the pulley to more effectively transfer traction and avoid slippage between the pulley and the belt.

The continuous belt is driven to translate with respect to the pulleys and thereby carries the materials between the loading and discharge points, which may be a considerable distance apart and may include changes in direction or elevation. The pulleys are typically supported to rotate to carry the passing belt and may be of various different types and configurations depending on their function and location in the belt conveyor system. For example, to drive the belt, a drive pulley operatively coupled to an electric motor or other power source is included at one end of the conveyor system with the continuous belt partially wrapped around it. When the drive pulley is rotated by an applied force, friction between the curvilinear surface of the drive pulley and the continuous belt wrapped around it results in translational movement of the belt. Another pulley may be a tail or return pulley located at the opposite end of the conveyor system that the continuous belt is partially wrapped around for redirection back toward the drive pulley. Idler pulleys may be located between the drive and return pulleys to support the belt and take-up pulleys may be used to remove slack and increase tension in the belt.

As can be appreciated, friction between the pulleys and the belt, and also uneven tension on the belt, which may vary based on the loading condition of the conveyor, changes in conveyor speed, the presence of abrasive or other wearing material between the belt and pulley, and other factors, may wear the pulley and may also create vibration in the belt and/or the pulley during operation. Such wear is undesired as it increases power consumption to operate the conveyor system and can also lead to failures, which may require time-consuming and costly repair and replacement of components. Vibration is also undesirable at it may increase pulley and/or belt wear, accelerate wear on the motors and any gearboxes driving the pulleys, and so forth.

BRIEF SUMMARY

In one aspect, the present disclosure describes a drive pulley for a continuous conveyor. The drive pulley includes an inner drum disposed on an axle, the inner drum having a generally cylindrical shape defining an outer peripheral surface. A traction drum is disposed along the outer peripheral surface of the inner drum, the traction drum having a thickness in a radial direction relative to the axle that is adapted to be subject to wear during driving contact between the traction drum and a conveyor belt. At least one sensor is embedded in the traction drum, the at least one sensor having an outer wear surface that coincides with an outer surface of the traction drum, wherein the at least one sensor is configured to wear such that the outer wear surface of the at least one sensor is adapted to wear at a same rate as the outer surface of the traction drum. The at least one sensor configured to generate a wear signal that is indicative of wear of the traction drum.

In an embodiment, the drive pulley further comprises a controller disposed on the inner drum, the controller being electrically connected to the at least one sensor and configured to receive the wear signal, wherein the controller operates to transmit a signal indicative of the wear signal wirelessly. The at least one sensor may further comprise a vibration sensing element, the vibration sensing element operating to sense a vibration at the inner drum and provide a vibration signal, and the controller may be disposed to receive the wear signal and the vibration signal. In an embodiment, the drive pulley may include a plurality of sensors embedded at different locations within the traction drum. In one example, the plurality of sensors and the at least one sensor are arranged in a line along an axis that is parallel to a centerline of the axle. In an embodiment, the at least one sensor may include a substrate onto which electrical paths are formed having a known resistance, the electrical paths formed in branches extending from one end of the substrate to another such that successive branches are destroyed as the substrate wears down along with the traction drum to change an overall resistance of the electrical paths.

In another aspect, the disclosure describes a conveyor system. The conveyor system includes a frame; a support pulley rotatably mounted on the frame; a drive pulley rotatably mounted between the frame and a prime mover; and a conveyor belt loop extending over the drive pulley and the support pulley such that rotation of the drive pulley by the prime mover causes the conveyor belt loop to travel endlessly relative to the frame. In one embodiment, the drive pulley comprises an inner drum disposed on an axle rotatably supported between the frame and the prime mover, the inner drum having a generally cylindrical shape defining an outer peripheral surface; a traction drum disposed along the outer peripheral surface of the inner drum, the traction drum having a thickness in a radial direction relative to the axle that is subject to wear during driving contact between the traction drum and the conveyor belt loop; and at least one sensor embedded in the traction drum, the at least one sensor having an outer wear surface that coincides with an outer surface of the traction drum. The at least one sensor is configured to wear at a same rate as the outer surface of the traction drum, the at least one sensor configured to generate a wear signal that is indicative of wear of the traction drum.

In an embodiment, the conveyor system further includes a controller disposed on the inner drum of the drive pulley, the controller being electrically connected to the at least one sensor and configured to receive the wear signal, wherein the controller operates to transmit a signal indicative of the wear signal wirelessly.

In an embodiment, the at least one sensor further comprises a vibration sensing element, the vibration sensing element operating to sense a vibration at the inner drum and provide a vibration signal. In such embodiment, a controller may be disposed to receive the wear signal and the vibration signal.

In an embodiment, the conveyor system may further include a plurality of sensors embedded at different locations within the traction drum, which may be arranged in a line along an axis that is parallel to a centerline of the axle.

In an embodiment, the at least one sensor includes a substrate onto which electrical paths are formed having a known resistance, the electrical paths formed in branches extending from one end of the substrate to another such that successive branches are destroyed as the substrate wears down along with the traction drum to change an overall resistance of the electrical paths.

In yet another aspect, the disclosure describes a method for operating a conveyor system. The method includes providing a frame, a support pulley rotatably mounted on the frame, a drive pulley rotatably mounted between the frame and a prime mover, and a conveyor belt loop extending over the drive pulley and the support pulley. The method further includes operating the drive pulley to causes the conveyor belt loop to travel endlessly relative to the frame. In an embodiment, the drive pulley comprises an inner drum disposed on an axle rotatably supported between the frame and the prime mover, the inner drum having a generally cylindrical shape defining an outer peripheral surface; a traction drum disposed along the outer peripheral surface of the inner drum, the traction drum having a thickness in a radial direction relative to the axle that is subject to wear during driving contact between the traction drum and the conveyor belt loop; and at least one sensor embedded in the traction drum, the at least one sensor having an outer wear surface that coincides with an outer surface of the traction drum. The method further includes causing the at least one sensor to wear at a same rate as the outer surface of the traction drum; using the at least one sensor to generate a wear signal that is indicative of wear of the traction drum; and providing the wear signal to a controller.

In an embodiment, the at least one sensor further comprises a vibration sensing element, and the method further comprises using the at least one sensor to sense a vibration at the inner drum, and providing a vibration signal to the controller.

In an embodiment, the method further includes providing a plurality of sensors embedded at different locations along the traction drum, which may be arranged in a line along an axis that is parallel to a centerline of the axle.

In an embodiment, the at least one sensor includes a substrate onto which electrical paths are formed having a known resistance, the electrical paths formed in branches extending from one end of the substrate to another such that successive branches are destroyed as the substrate wears down along with the traction drum to change an overall resistance of the electrical paths.

In an embodiment, the method further includes inferring, using the controller, a wear state of the drive pulley based on a change in the overall resistance of the electrical paths.

DETAILED DESCRIPTION

The present disclosure is applicable to continuous conveyor systems and, more particularly, to pulleys for conveyor systems having a wearable surface and sensors for monitoring and diagnosing a wear state of the pulley and/or a sensor for sensing vibration in the pulley, in accordance with the disclosure.

Figure 1:
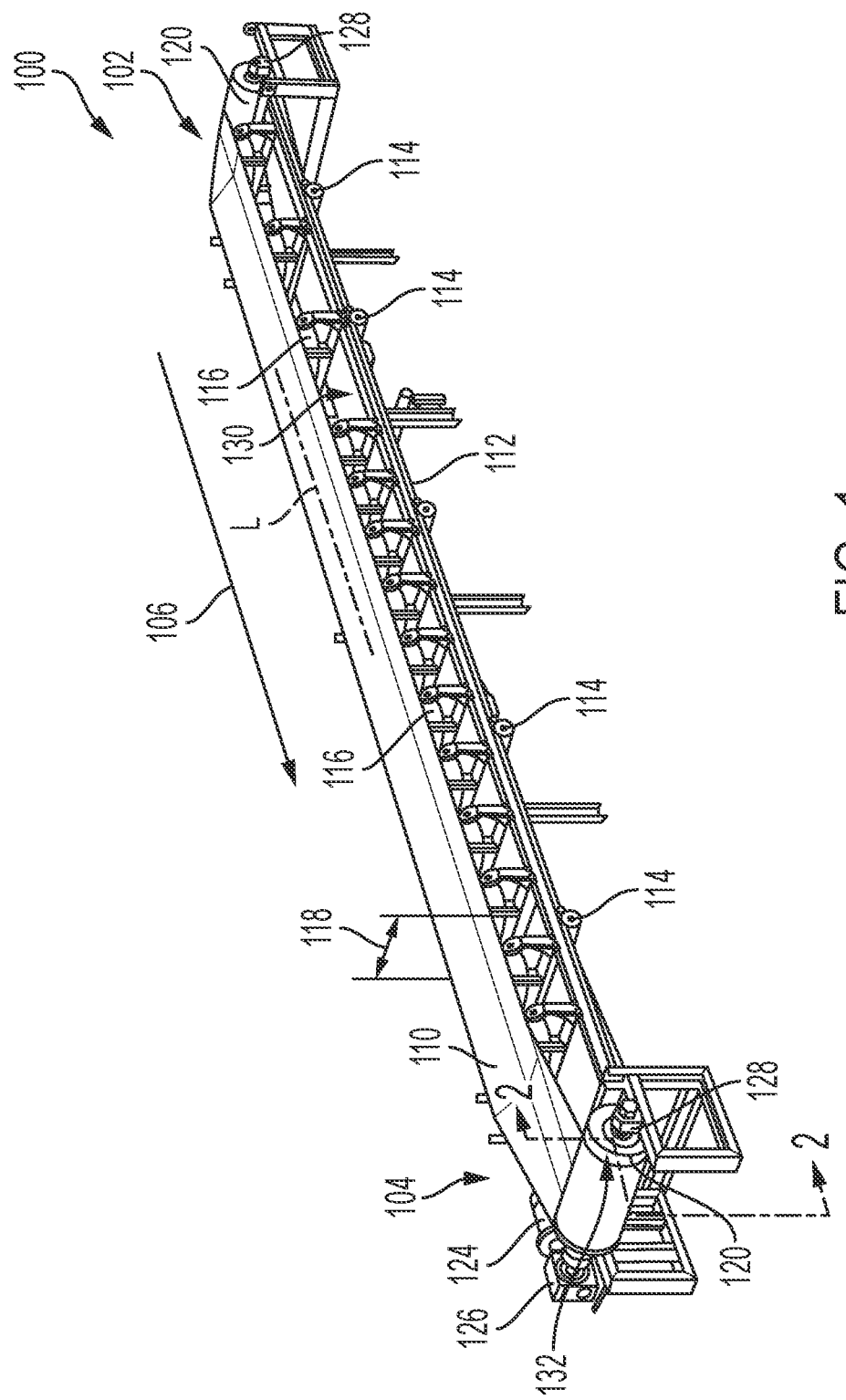
FIG. 1 is an exemplary conveyor system in accordance with the disclosure.

An exemplary type of a continuous conveyor or belt conveyor system 100 is shown in FIG. 1. The belt conveyor system 100 illustrated is an example of a large scale belt conveyor system 100 for the transportation of bulk materials over a distance from a loading point 102 to a discharge point 104. The distance between the loading point 102 and discharge point 104 may be considerable and may include one or more conveyor systems 100 arranged in series with the loading point of one disposed to receive material from the discharge point of another.

Belt conveyor systems such as the belt conveyor system 100 are configured to cover long distances. The direction of travel 106 for carried material from the loading point 102 to the discharge point 104 may be referred to as a travel direction 106 and may include inclines, declines, and curves. The exemplary conveyor system 100 includes an elongated, flexible belt 110 attached to itself to form a closed, continuous loop that is supported by and can translate with respect to a frame 112. The frame 112 includes various fixed structural components creating a framework extending between the loading and discharge points 102, 104. The frame 112 also supports idler pulleys 114 and support rollers 116, which support the weight of aggregate carried on the belt 110 along the length of the frame 112 and also guide the non-weight bearing return portion of the belt 110 back from the discharge point 104 towards the loading point 102.

The belt 110 may be a flat belt with opposing planar surfaces and have a substantial belt width 118 traverse to its elongated direction, L, to support the material being transported. The belt 110 may also be a toothed belt or include additional traction inducing mechanisms (not shown), in the known fashion, especially when transporting aggregate material up or down inclined paths. The belt 110, while typically made of a flexible material, may be made from a plurality of laminated layers and may include steel and/or synthetic cords or bands, or the like for strength. When disposed over the frame 112, the belt 110 is held in tension between the loading and discharge points 102, 104 and provides a planar surface moving in the travel direction 106 onto which the material may be deposited and carried. As a closed loop, the belt can be redirected at the discharge point 104 and returned to the loading point 102 in continuous circulation. The material may be held at rest on the belt 110 by gravity. In some cases, to reduce or avoid spillage, the flat belt 110 may be shaped into a trough by curving its width 114 along the run between the loading and discharge points 102, 104 by, for example, inclining the various support rollers 116 on the frame 112.

To support and carry the continuous belt 110, the idler and support pulleys or rollers 114 and 116 rollers are rotatably mounted at different locations over the length the frame 112 and rotate along an axis that is transverse to the elongate axis L of the belt 110. The pulleys 114 and 116 are elongated cylindrical structures that are oriented traverse to the travel direction 106 of the belt 110 so that it passes across the pulleys 114 and 116. The pulleys 114 and 116 may be provided in varies types, sizes and configurations. Drive pulleys 120 are disposed at one or both of the loading and discharge points 102 and 104.

For example, to drive the belt 110, a drive pulley 120 can be included at the discharge point 104 to pull the loaded belt 110 towards the discharge point 104. To avoid slack on the belt 110, and to reduce tension effects, an additional drive pulley 120 may be mounted to the frame 112 adjacent the loading point 102 of the belt 110. Each drive pulley 120 is operatively associated with a prime mover 124 through a gearbox 126 for powering rotation. The prime mover 124 may be any appropriate device that provides mechanical motive force to rotate the pulley 120 such as electric motors, hydraulic motors, pneumatic motors, and the like. Bearings 128 provide support and, in certain applications, tension to the belt 110.

When the drive pulley 120 is rotated, the belt 110 that is partially disposed or wrapped around the drive pulley 120 will be pulled by traction arising from frictional forces created between an inner surface 130 of the belt 110 and an outer cylindrical surface 132 of the drive pulley 120. It will be appreciated that the larger the contact area between the belt 110 and drive pulley 120, measured across the belt width 118 and the angular contact or wrap around the circumference of the drive pulley 120, will increase the amount of drive traction and force imparted to the belt 110. Located at the loading point 102 at the opposite end of the conveyor system 100 is a tail or return pulley 120, which may or may not be powered, which redirects the continuous looped belt 110 back to the discharge point 104. To support and direct the belt 110. Other examples of pulleys 120 include take-up pulleys for reducing belt slack, snub pulleys, and others.

Figure 2:
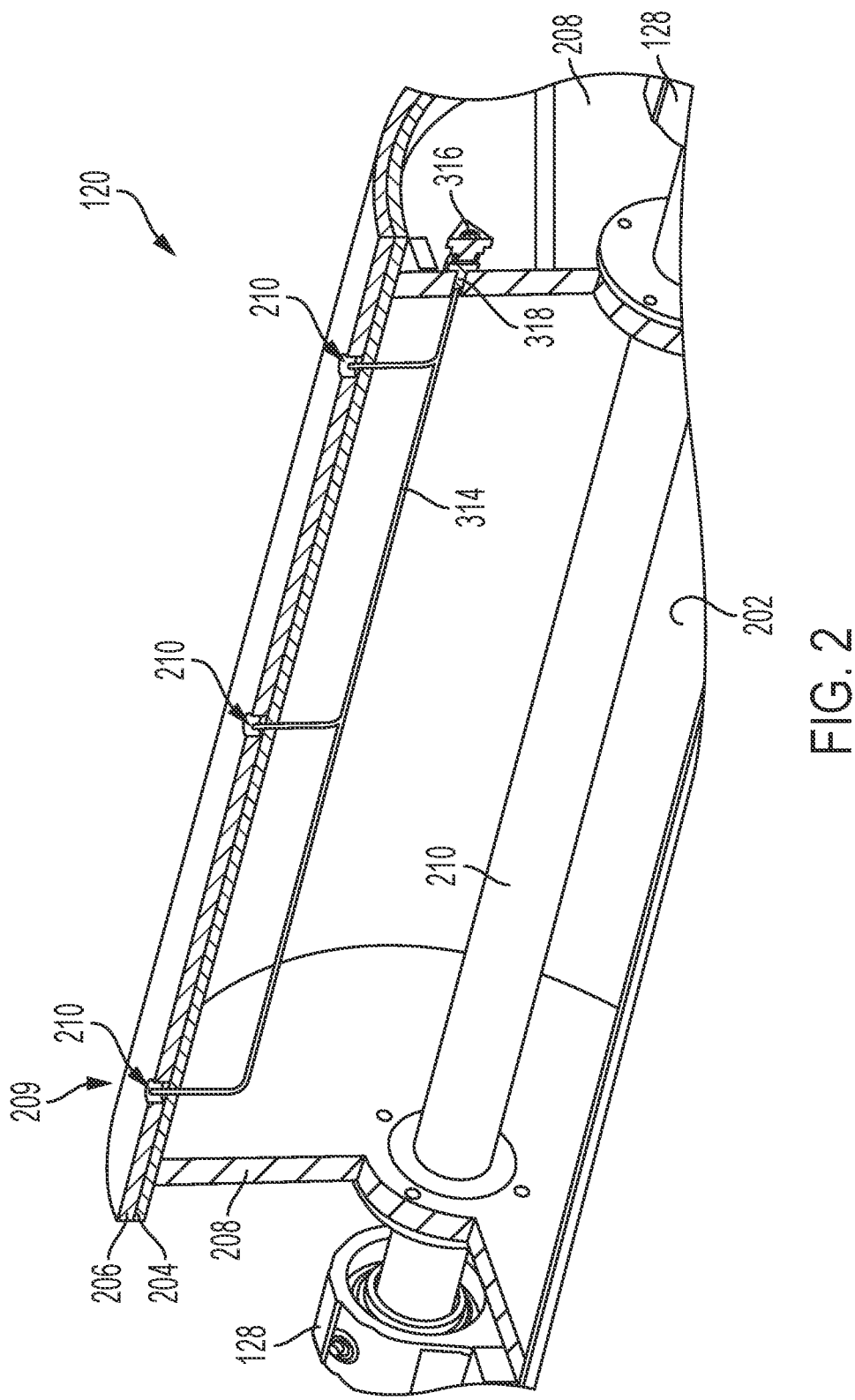
FIG. 2 is a partial section view through a pulley in accordance with the disclosure.
Figure 3:
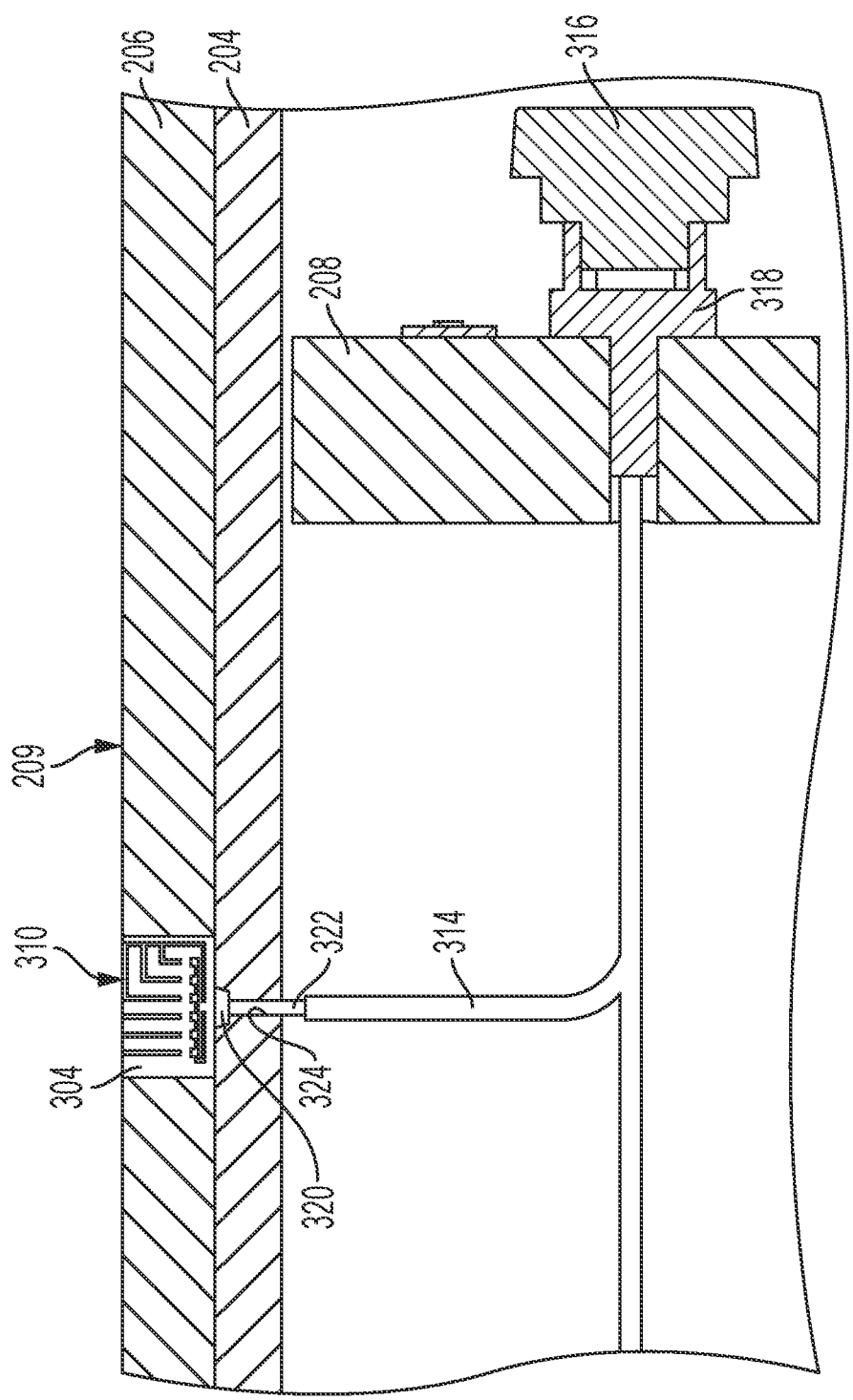
FIG. 3 is an enlarged, detail cross section through a pulley in accordance with the disclosure.
Figure 5:
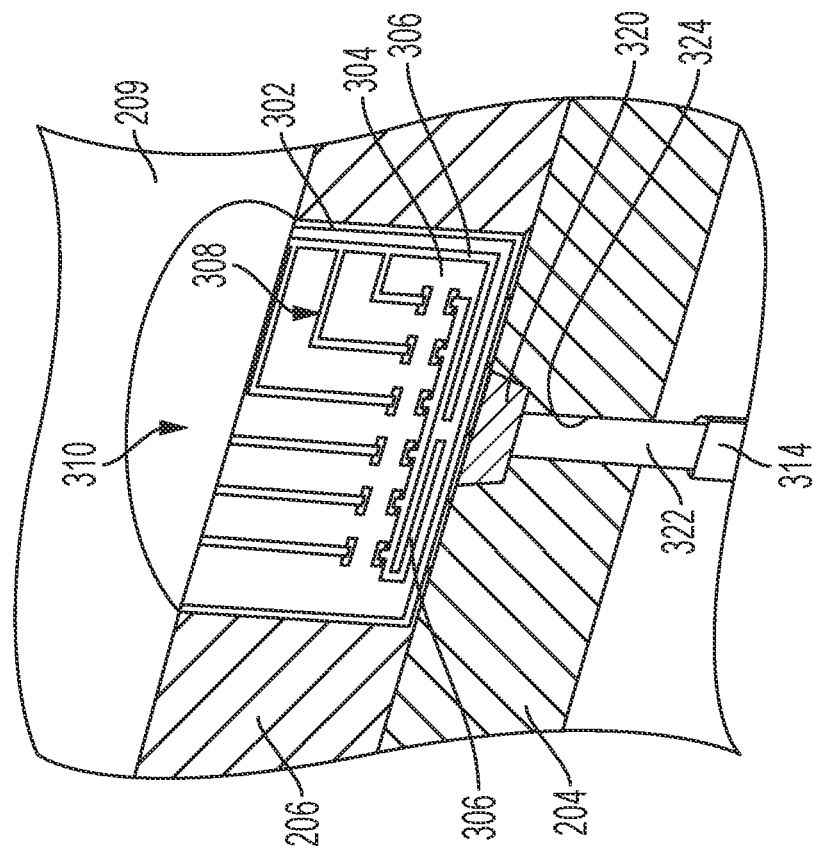
FIG. 5 is an enlarged cross section view of a wear sensor in an installed position in accordance with the disclosure.

A partial section through the drive pulley 120 is shown in FIG. 2, and an enlarged detail view is shown in FIG. 3 and also in FIG. 5. In reference to these figures, the pulley 120 may be configured as a drive pulley, although aspects of the disclosure may be applicable to other types of pulleys utilized with belt conveyor systems. The pulley 120 includes a generally cylindrical body 202 that includes a support drum 204 and a traction drum 206 extending between endplates 208 disposed in spaced relation along an axle 210. The axle is supported onto the frame 112 through the bearings 128, which are mounted onto elements of the frame 112. The support and traction drums 204 and 206 have a generally cylindrical shape that forms the roller drive surface or outer surface 132 (FIG. 1). The shape of the cylindrical drums 204 and 206 may define an axis that coincides with a centerline of the axle 210 and corresponds to the axis of rotation when the pulley 120 is rotated.

In the illustrated example, the inner or support drum 204 and endcaps 208 may be made from a structurally rigid material such as metal, steel, fiberglass and the like. The outer or traction drum 206 may be made from a material that frictionally engages the belt 110 for driving the belt. Suitable materials for the traction drum 206 can include rubber, composites, ceramics, polymers and the like. As can be appreciated, the traction drum 206 may wear during operation due to heat and friction with the belt and also abrasion from the aggregate material carried by the belt that may be present in the interface between the pulley 120 and the belt 110 during operation. The traction drum 206 may further include sipes or other depressions, ridges or features to permit work material and aggregate or other debris to avoid being pressed in the interface between the pulley 120 and belt 110 while also improving traction to drive the belt 110 with the pulley 120.

In the illustrated embodiment, the traction drum 206 may be bolted, keyed or otherwise attached mechanically and/or with use of adhesives to the inner drum 204. The traction drum 206 may be replaceable and subject to wear during operation. For at least this reason, and for indicating a spent or remaining life of the traction drum material 206, depth sensors or wear sensors 210 can be used. During use, wear of the traction drum 206 may cause an outer layer 209 of the drum material to be worn and removed from the drum, similar to a tire for a vehicle, such that the thickness of the traction drum layer 206 may be reduced and/or worn, scuffed or otherwise degraded over time. The sensors 210 can be configured to wear along with the material or reduction in thickness of the traction drum and provide a signal indicative of their wear or reduction in thickness to a controller (not shown). The controller can then correlate the signals indicative of sensor wear with a degree of wear for the traction drum 206 itself, and thus monitor, estimate or predict the drum wear to determine when the traction drum 206 has worn sufficiently to warrant repair or replacement of the drum 210 and also the sensors 210.

In the illustration of FIG. 2 there are three sensors 210 shown disposed at regular intervals along different axial locations along an axis disposed on the outer layer 209 of the traction drum 206 that directly contacts the belt 110 once per revolution of the drive pulley 120. As can be appreciated, depending on the location of wear expected on the pulley 120 more or fewer sensors 210 can also be used.

Figure 4:
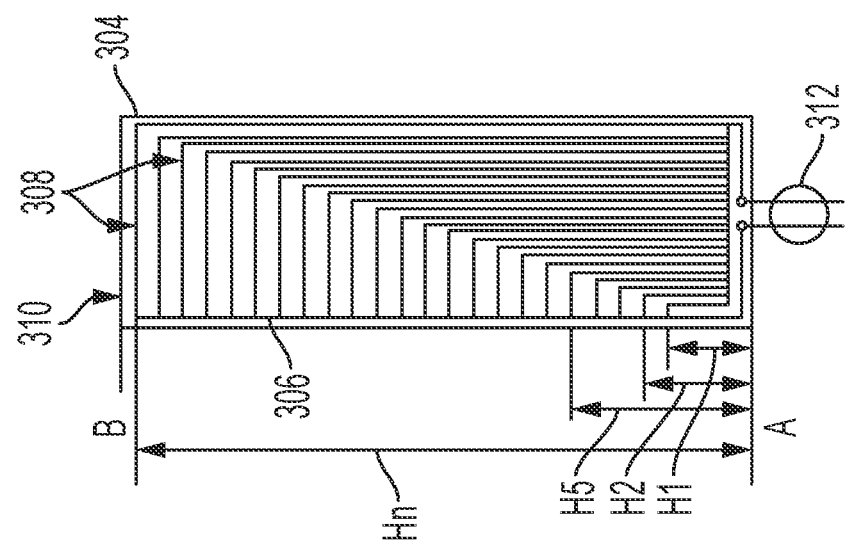
FIG. 4 is an outline view of a wear sensor in accordance with the disclosure.

As can be seen in FIG. 5, each sensor 210 includes a housing 302 that includes an electrically insulating material such as a printed circuit board (PCB) 304 that has printed thereon electrical paths 306 of a known resistance. In further reference to FIG. 4, the electrical paths 306 are formed as a plurality of branches 308, each of which extends to a different height, H1, H2, H3 . . . Hn from one end A of the PCB 304 to a free end B, where "n" represents the number of branches. The branches 308 may be placed at regular intervals along the PCB 308 between points A and B, or may alternatively be spaced closer to one another, i.e., at decreasing heights Hn as they approach point A from point B to provide higher resolution to a wear signal, as will be described hereinafter. In the embodiment shown in FIG. 4, it can be seen that the various lengths of the branches 308 change as the distance from point A increases, which means that in this embodiment each branch may have a particular length and, thus, a particular resistance, which when subjected to a known voltage and corrected, for example, based on temperature, produces a unique current draw for each successive destruction of branches during operation. Thus, a spot check of the current through the sensor may tell the controller exactly where the wear boundary is on the sensor and, consequently, how may branches have been destroyed and how many remain, which then permits a calculation of the remaining thickness of the traction layer and the remaining life of the drive pulley.

During operation, a free end 310 of the sensor 210 is exposed and coplanar with an outer layer 209 of the traction drum 206. As the outer layer wears down, the free end 310 and the material of the PCB 304 and electrical paths 306 also wear at the same rate such that a total resistance along the various paths 306 changes or decreases as each branch 308 lying at an outermost location of the PCB 304 wears away. This reduction in resistance at the PCB 304 due to wear of the braches 308 may be sensed as an electrical current change when a known voltage is applied continuously onto leads 312 of the PCB 304. The changing current can then be correlated in a controller 316 connected to the leads 312, for example, via conductors 314, that monitors the current drawn at each sensor 210. In the embodiment shown, a plurality of sensors 210 are connected via the same or separate conductors to a connector 318 extending through the endplate 208 to the controller 316. The controller 316 may be battery powered and placed outside the enclosure of the inner drum 204 and end plates 208 to communicate signals wirelessly to a central control (now shown) that are indicative of the current at each sensor 210 and, thus, the degree of wear at different locations of the traction drum 206 either periodically or continuously and in real time.

As can be appreciated, the construction of the sensor 210 can be modified depending on the materials available for construction. For example, the PCB 304 may be replaced by a thermoset or epoxy material, or the like, in which electrical conductors to form the paths 306 can be embedded to form the branches 308.

In the embodiment illustrated, each sensor 210 further includes an accelerometer or vibration sensing element 320. The vibration sensor 320 may sense vibration during operation due to uneven wear, slippage, or changes in tension in the belt 110 due to uneven loading. The sensed vibration can be along one, two, three or more axes relative to the sensor 320. A stem 322 that supports and powers the current and vibration sensing elements of the sensor 210 may be installed through a bore 324 extending radially through the inner drum 204. The stem 322 may carry conductors that connect to the wires 314 providing signals to the controller 316.

Figure 6:
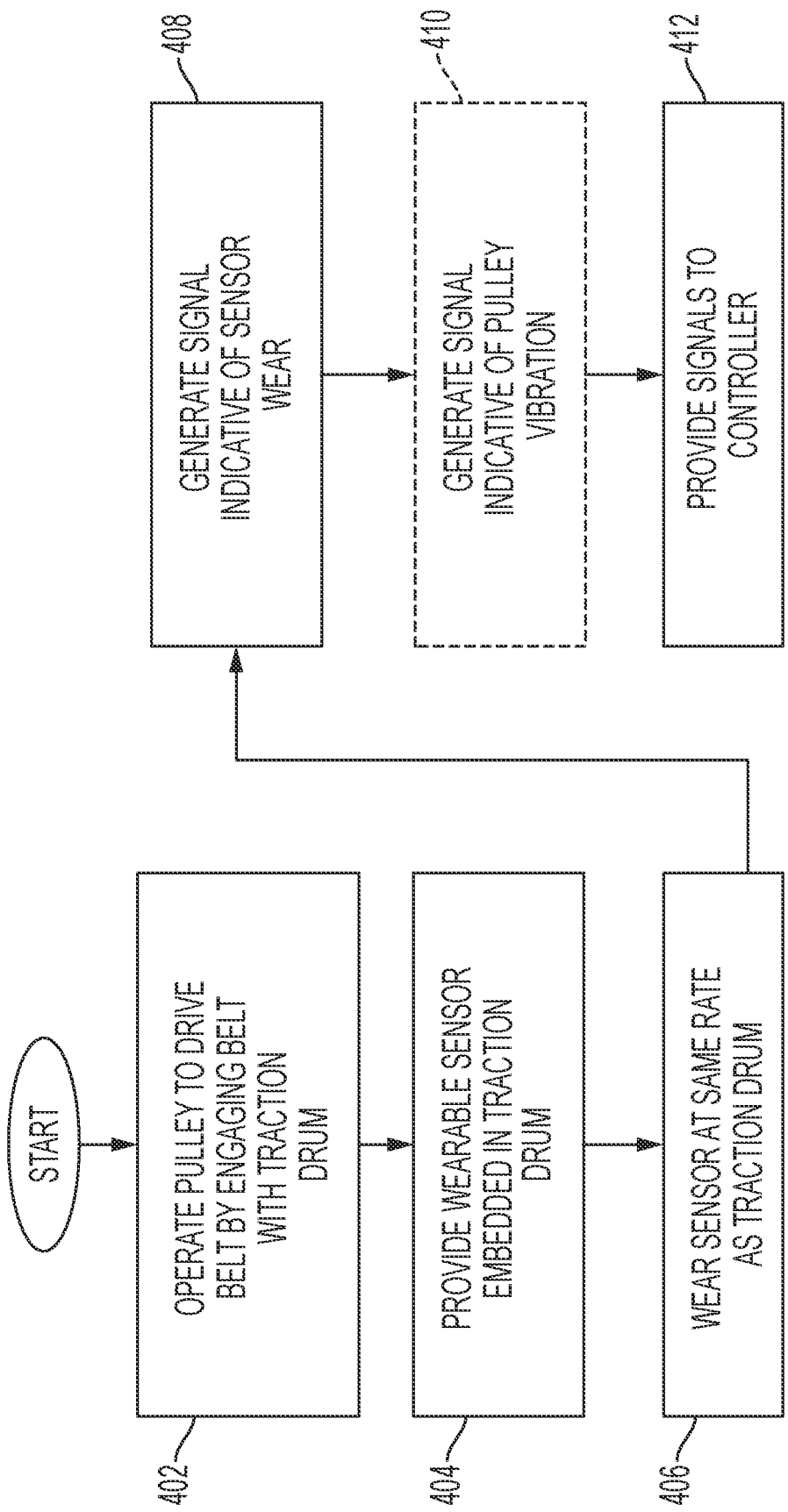
FIG. 6 is a flowchart for a method in accordance with the disclosure.

A flowchart for a method of monitoring wear in a traction drum of a drive pulley for a conveyor system is shown in FIG. 6. In accordance with the method, a conveyor system is operated at 402 by engaging an endless conveyor belt with a traction drum. A wearable sensor, i.e., a sensor that is configured to wear or be worn at the same or at least a similar wear rate as the traction drum, is provided embedded into the drum at 404 such that wear of an external face or surface of the traction drum also causes wear of the sensor that is embedded therein at 406. As the system operates, wear of the sensor that corresponds to drum wear causes a signal to be generated indicative of the wear at 408. Optionally, a vibration signal indicative of pulley vibration can also be generated at 410. The wear signal and, optionally, the vibration signal can be provided to a controller 412. The controller may process and/or relay the signal(s) to a central control for determining either periodically or in real time during operation the degree of wear of the drive pulley and/or the belt so that maintenance and/or replacement of worn and/or failed parts can be scheduled.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A drive pulley for a continuous conveyor, comprising:
an inner drum disposed on an axle, the inner drum having a generally cylindrical shape defining an outer peripheral surface;
a traction drum disposed along the outer peripheral surface of the inner drum, the traction drum having a thickness in a radial direction relative to the axle that is adapted to be subject to wear during driving contact between the traction drum and a conveyor belt;
at least one sensor embedded in the traction drum, the at least one sensor having an outer wear surface that coincides with an outer surface of the traction drum, wherein the at least one sensor is configured to wear such that the outer wear surface of the at least one sensor is adapted to wear at a same rate as the outer surface of the traction drum, the at least one sensor configured to generate a wear signal that is indicative of wear of the traction drum.

2. The drive pulley of claim 1, further comprising a controller disposed on the inner drum, the controller being electrically connected to the at least one sensor and configured to receive the wear signal, wherein the controller operates to transmit a signal indicative of the wear signal wirelessly.

3. The drive pulley of claim 1, wherein the at least one sensor further comprises a vibration sensing element, the vibration sensing element operating to sense a vibration at the inner drum and provide a vibration signal.

4. The drive pulley of claim 3, further comprising a controller disposed to receive the wear signal and the vibration signal.

5. The drive pulley of claim 1, further comprising a plurality of sensors embedded at different locations within the traction drum.

6. The drive pulley of claim 5, wherein the plurality of sensors and the at least one sensor are arranged in a line along an axis that is parallel to a centerline of the axle.

7. The drive pulley of claim 1, wherein the at least one sensor includes a substrate onto which electrical paths are formed having a known resistance, the electrical paths formed in branches extending from one end of the substrate to another such that successive branches are destroyed as the substrate wears down along with the traction drum to change an overall resistance of the electrical paths.

8. A conveyor system, comprising:
a frame;
a support pulley rotatably mounted on the frame;
a drive pulley rotatably mounted between the frame and a prime mover; and
a conveyor belt loop extending over the drive pulley and the support pulley such that rotation of the drive pulley by the prime mover causes the conveyor belt loop to travel endlessly relative to the frame;
wherein the drive pulley comprises:
an inner drum disposed on an axle rotatably supported between the frame and the prime mover, the inner drum having a generally cylindrical shape defining an outer peripheral surface;
a traction drum disposed along the outer peripheral surface of the inner drum, the traction drum having a thickness in a radial direction relative to the axle that is subject to wear during driving contact between the traction drum and the conveyor belt loop; and
at least one sensor embedded in the traction drum, the at least one sensor having an outer wear surface that coincides with an outer surface of the traction drum; and
wherein the at least one sensor is configured to wear at a same rate as the outer surface of the traction drum, the at least one sensor configured to generate a wear signal that is indicative of wear of the traction drum.

9. The conveyor system of claim 8, further comprising a controller disposed on the inner drum of the drive pulley, the controller being electrically connected to the at least one sensor and configured to receive the wear signal, wherein the controller operates to transmit a signal indicative of the wear signal wirelessly.

10. The conveyor system of claim 8, wherein the at least one sensor further comprises a vibration sensing element, the vibration sensing element operating to sense a vibration at the inner drum and provide a vibration signal.

11. The conveyor system of claim 10, further comprising a controller disposed to receive the wear signal and the vibration signal.

12. The conveyor system of claim 8, further comprising a plurality of sensors embedded at different locations within the traction drum.

13. The conveyor system of claim 12, wherein the plurality of sensors and the at least one sensor are arranged in a line along an axis that is parallel to a centerline of the axle.

14. The conveyor system of claim 8, wherein the at least one sensor includes a substrate onto which electrical paths are formed having a known resistance, the electrical paths formed in branches extending from one end of the substrate to another such that successive branches are destroyed as the substrate wears down along with the traction drum to change an overall resistance of the electrical paths.

15. A method for operating a conveyor system, comprising:
providing a frame, a support pulley rotatably mounted on the frame, a drive pulley rotatably mounted between the frame and a prime mover, and a conveyor belt loop extending over the drive pulley and the support pulley;
operating the drive pulley to causes the conveyor belt loop to travel endlessly relative to the frame;
wherein the drive pulley comprises:
an inner drum disposed on an axle rotatably supported between the frame and the prime mover, the inner drum having a generally cylindrical shape defining an outer peripheral surface;
a traction drum disposed along the outer peripheral surface of the inner drum, the traction drum having a thickness in a radial direction relative to the axle that is subject to wear during driving contact between the traction drum and the conveyor belt loop; and
at least one sensor embedded in the traction drum, the at least one sensor having an outer wear surface that coincides with an outer surface of the traction drum;
causing the at least one sensor to wear at a same rate as the outer surface of the traction drum;
using the at least one sensor to generate a wear signal that is indicative of wear of the traction drum; and
providing the wear signal to a controller.

16. The method of claim 15, wherein the at least one sensor further comprises a vibration sensing element, and wherein the method further comprises using the at least one sensor to sense a vibration at the inner drum, and providing a vibration signal to the controller.

17. The method claim 15, further comprising providing a plurality of sensors embedded at different locations along the traction drum.

18. The method of claim 17, wherein the plurality of sensors and the at least one sensor are arranged in a line along an axis that is parallel to a centerline of the axle.

19. The method of claim 15, wherein the at least one sensor includes a substrate onto which electrical paths are formed having a known resistance, the electrical paths formed in branches extending from one end of the substrate to another such that successive branches are destroyed as the substrate wears down along with the traction drum to change an overall resistance of the electrical paths.

20. The method of claim 19, further comprising inferring using the controller a wear state of the drive pulley based on a change in the overall resistance of the electrical paths.

* * * * *